Patented Mar. 24, 1953

2,632,778

UNITED STATES PATENT OFFICE 2,632,778

PROCESS FOR SEPARATING NAPHTHENES FROM PARAFFIN HYDROCARBONS

Fredrick L. Jonach, Richmond Hill, N. Y., assignor to Standard Oil Development Company, a corporation of Delaware No Drawing. Application July 19, 1950, Serial No. 174,789

6 Claims. (Cl. 260—666)

This invention relates to the separation of hydrocarbons and is particularly directed to a method of separating naphthene hydrocarbons from a mixture containing naphthenes and paraffins.

It is known in the art to separate hydrocarbons by means of solid adsorbents, such as carbon or silica gel. It is generally recognized that the adsorptive affinity of silica gel and like adsorbents for hydrocarbons varies with the hydrocarbon type in the following decreasing order:

(1) Aromatics
(2) Olefins
(3) Naphthenes and paraffins

It is possible to utilize this selective adsorption by solid adsorbents to separate aromatics from olefins, naphthenes and paraffins, and to separate olefins from naphthenes and paraffins. However, the affinity of solid adsorbents for naphthenes and for paraffins is so nearly the same that it has generally been considered impractical to attempt to separate naphthenes from paraffins by selective adsorption.

It has now been found that naphthenes can be separated from paraffins by adsorption on silica gel and other adsorbents when the adsorbent has been pretreated with selected materials such as glycols, glycol ethers, aniline, acetone, isopropyl alcohol, etc. The materials which have been found to be effective pretreating agents all fall in the class of selective solvents for hydrocarbons, although they do not appear to have been employed successfully for the particular separation of naphthenes from paraffins. The mechanism whereby the solid adsorbents are improved for naphthene-paraffin separation by the presence of the solvent is not known with certainty. One explanation is that the solvent in the adsorbed state functions as a superior selective solvent for naphthenes. Another explanation is that the solvent plugs up those pores in the adsorbent that normally adsorb paraffins. Whatever the mechanism may be, the invention provides a novel improved adsorbent, and a new and improved process for the separation of hydrocarbons.

The advantages of the invention will be better understood from a consideration of the following experimental data which are given for the sake of illustration but without intention of limiting the invention thereto.

EXAMPLE I 373 cc. of an aromatic-free hydrocarbon feed stock boiling 115–250° and having a Research octane number of 66 was percolated at room temperature through 22 foot column, 1¼ inches in diameter filled with 4240 grams of silica gel containing 20% of the monoethyl ether of diethylene glycol, commonly called Carbitol. In this example, and in the other examples reported below, flow of the feedstock through the gel was maintained by the use of isopropyl alcohol as a chaser, although this is not necessary when operating continuously. The first 50% percolated was found to be enriched in paraffins and to possess an octane number of 60. The last 50% percolated was increased in naphthenic content and found to have an octane number of 70. The following data were obtained:

Table I

| | Paraffins (Vol. Percent) | | | Naphthenes (Vol. Percent) | | | Research Octane No. |
|---|---|---|---|---|---|---|---|
| | Normal | Iso- | Total | Cyclo C₅ | Cyclo C₆ | Total | |
| Feed | 22 | 36 | 58 | 22 | 20 | 42 | 66 |
| Cut 1 [1] | 27 | 46 | 73 | 14 | 13 | 27 | |
| Cut 36 [2] | 21 | 35 | 56 | 23 | 21 | 44 | |
| Cuts 1–36 (blended) | 26 | 44 | 70 | 16 | 14 | 30 | 60 |
| Cuts 69–70 [3] | 17 | 29 | 46 | 28 | 26 | 54 | |
| Cuts 37–70 (blended) | 19 | 32 | 51 | 26 | 23 | 49 | 70 |

[1] Represents 0 to 1.4% percolated.
[2] Represents 49.3 to 50.7% percolated.
[3] Represents 95.8 to 98.5% percolated.

EXAMPLE II 18.6 cc. of the same feed stock used in Example I was percolated at room temperature through two different 270 cc. batches of silica gel, one batch of silica gel being untreated and the other treated with Carbitol in the ratio of 46.3 grams of Carbitol and 185.3 grams of silica gel with the following results:

Table II

| Compound Type by Raman | Feed, Vol. Percent | Analysis of Last 30% of Percolated Material | |
|---|---|---|---|
| | | Without Carbitol | With Carbitol |
| n-Paraffins | 22 | 23 | 15 |
| Iso-Paraffins | 36 | 35 | 25 |
| Cyclopentanes | 22 | 23 | 31.5 |
| Cyclohexanes | 20 | 19 | 28.5 |
| Ratio of n/isoparaffins | 0.6 | 0.7 | 0. |
| Ratio of CyC$_5$/CyC$_6$ | 1.1 | 1.2 | 1.1 |
| Ratio of paraffins to naphthenes | 1.4 | 1.4 | 0.7 |

The above data clearly indicate that pretreatment of silica gel with Carbitol increases the adsorptive affinity of silica gel toward naphthenic hydrocarbons to an important degree.

EXAMPLE III

A mixture of 50.2 mol percent of normal heptane in methylcyclohexane was percolated at room temperature through a column of silica gel pre-treated with 25% of various materials. The following comparative data were obtained on the first fraction percolated:

Table III

| Pretreating Agent | Product Composition (mol percent n-C$_7$) |
|---|---|
| None | 54.4 |
| Ethylene Glycol | 78.9 |
| Carbitol | 73.7 |
| Aniline | 66.9 |
| Acetone | 64.5 |
| Isopropyl Alcohol | 62.3 |
| Dimethoxytetraethyleneglycol | 62.3 |
| Methoxytriglycol | 61.7 |

The above data indicate that selective solvents in general increase the selectivity of adsorbents for particular types of hydrocarbons. The data also indicate that ethylene glycol and Carbitol are eminently superior in their ability to increase the adsorptive affinity of silica gel toward naphthenes and that aniline, acetone, isopropyl alcohol, dimethoxy triglycol also markedly increase this affinity.

It will be obvious to those skilled in the art that the improved adsorbents of the invention can be utilized either batch-wise or continuously. For example, in continuous operation the granular or fluidized powdered adsorbent may be passed countercurrent to the feedstock in a tower adsorber, the adsorbent removed from the tower and stripped by heat and/or inert gas to recover adsorbed naphthenes, and then returned to the tower after having been re-treated with the selective solvent, if necessary. It will also be obvious that product streams can be returned to the tower as "reflux" in order to obtain greater purity, if desired. The invention can be practiced on normally liquid hydrocarbons such as light naphtha, heavy naphtha, kerosene, light and heavy heating oils and lubricating oils, or fractions thereof. It is generally preferred to employ relatively narrow fractions as feedstocks, and to carry out the adsorption step at a temperature in the range from about 25° F. to about 150° F., preferably 75° F. to 140° F.

The nature and objects of the present invention having been thus described and illustrated, what is claimed as new and useful and is desired to be secured by Letters Patent is:

1. A process for separating naphthenes from paraffin hydrocarbons which comprises contacting at room temperature a hydrocarbon feedstock boiling from 115° to 250° F. containing only paraffins and naphthenes with silica gel which has been previously contacted with a liquid selected from the group consisting of ethylene glycol, mono-methyl ether of diethylene glycol, aniline, acetone, isopropyl alcohol, dimethoxytetraethylene glycol and methoxytrigylcol.

2. Process according to claim 1 in which the material used to pretreat the silica gel is ethylene glycol.

3. Process according to claim 1 in which the material used to pretreat the silica gel is the monoethyl ether of diethylene glycol.

4. Process according to claim 1 in which the material used to pretreat the silica gel is aniline.

5. Process according to claim 1 in which the material used to pretreat the silica gel is acetone.

6. Process according to claim 1 in which the material used to pretreat the silica gel is isopropyl alcohol.

FREDRICK L. JONACH.

REFERENCES CITED

The following references are of record in the file of this patent:

UNITED STATES PATENTS

| Number | Name | Date |
|---|---|---|
| 2,425,535 | Hibshman | Aug. 12, 1947 |
| 2,464,931 | Hirschler | Mar. 22, 1949 |
| 2,487,804 | Hermanson | Nov. 15, 1949 |

FOREIGN PATENTS

| Number | Country | Date |
|---|---|---|
| 456,958 | Great Britain | Nov. 18, 1936 |